(12) United States Patent
Schlosser

(10) Patent No.: US 7,536,742 B2
(45) Date of Patent: May 26, 2009

(54) METHOD AND APPARATUS FOR PUSHING A DUAL DIAMETER PIG INTO A PIPELINE

(76) Inventor: Dean Schlosser, Box 687, Kerrobert (CA) S0L 1R0

( * ) Notice: Subject to any disclaimer, the term of this patent is extended or adjusted under 35 U.S.C. 154(b) by 737 days.

(21) Appl. No.: 11/224,337

(22) Filed: Sep. 12, 2005

(65) Prior Publication Data

US 2007/0056609 A1    Mar. 15, 2007

(51) Int. Cl.
- B08B 9/00 (2006.01)
- B08B 9/027 (2006.01)
- F16L 55/46 (2006.01)
- F16L 55/26 (2006.01)

(52) U.S. Cl. .................... 15/104.062; 15/3.5
(58) Field of Classification Search ........... 15/104.062, 15/3.5, 3.51; 134/22.1, 22.11, 22.12, 166 R, 134/168 C; 137/268

See application file for complete search history.

(56) References Cited

U.S. PATENT DOCUMENTS

| | | | | |
|---|---|---|---|---|
| 2,575,146 A | * | 11/1951 | Thomas | 15/104.062 |
| 4,716,611 A | * | 1/1988 | Barry | 15/3.51 |
| 5,444,886 A | * | 8/1995 | Takashina et al. | 15/3.51 |
| 2005/0066455 A1 | * | 3/2005 | Kafka | 15/3.5 |

* cited by examiner

Primary Examiner—Laura C Guidotti
(74) Attorney, Agent, or Firm—Stites & Harbison, PLLC; David W. Nagle, Jr.

(57) ABSTRACT

An apparatus for pushing a dual diameter pig through a conical reducer attached to a pig trap and into a pipeline includes a frame configured such that the pig rests and moves forward on the frame, which has a front end adapted for attachment to the trap. The vertical position of the frame can be adjusted to align the pig with the conical reducer. An actuator is supported on the frame rearward of, and aligned with, the pig and an actuator control extends the actuator into contact with the rear end of a pig, and also retracts the actuator. The actuator locks to the frame at lock locations spaced along the frame, and the lock locations are separated by a distance that is less than a stroke of the actuator. The pig is pushed into the trap in steps by repeatedly extending, retracting, and moving the actuator forward.

14 Claims, 3 Drawing Sheets

METHOD AND APPARATUS FOR PUSHING A DUAL DIAMETER PIG INTO A PIPELINE

This invention is in the field of pipelines, and in particular with pipeline pigs that are pushed into a pipeline for various purposes as are well known in the art.

BACKGROUND

Pipeline pigs are of various designs and are used for a variety of purposes. One type of pig is inserted into pipelines and pushed through pipelines to clean the pipeline. Other pigs may be used for batching or separating different products that are being transported in the pipeline by sealing to the walls of the pipeline and moving along the pipeline with the products. Still others are used to inspect the pipeline.

In certain pipelines, pumping stations are located at intervals along the line, and efficient pipeline design calls for a smaller diameter pipe connected to the output of the pumping station and a larger diameter pipe connected to the suction of the pumping station. Thus when moving downstream from one pumping station to the next, at a mid-point between the two pumping stations the pipeline transitions from, for example, a 36" diameter pipe to a 48" diameter pipe.

In order to clean these dual diameter pipelines, dual diameter pigs have been developed that have an expanded diameter suitable for operations to clean the larger diameter pipe, and a compressed diameter suitable for operations to clean the smaller diameter pipe. When the pipeline transitions from the smaller to the larger diameter pipe, the pig automatically expands. Various means for providing such expandable pigs are known, for example as disclosed in U.S. Pat. No. 5,457,841 to Minton. The dual diameter pigs are launched into the smaller pipe portion of the pipeline at a pig trap located at a pumping station.

At the pumping station the pipeline comes out of the ground and an access port is provided to allow the pig to be pushed into the pipeline. A diverter conduit and valves are provided such that product can continue to flow through the pipeline while the pig trap is isolated from the flow and drained. Once drained a door covering the port is opened and the pig is pushed into the trap, the door is closed and valves are operated to direct pipeline flow through the pig trap and thus carry the pig down the pipeline.

Since the pig is launched into the smaller pipe at the output of the pumping station, it must be compressed to its smaller size. The pig trap will have a diameter equal to the diameter of the smaller pipe. For example with dual diameter pipeline having a 36" smaller pipe and a 48" larger pipe, the pig will have corresponding compressed and expanded diameters, and the pig trap will have a 36" diameter. A conical reducer is typically used to compress the pig for insertion into the trap. The reducer will have a smaller end with a 36" diameter opening fixed to the 36" pig trap opening, and tapering outward to a larger open end with about a 48" opening. The pig is placed into the 48" opening and forced through the reducer into the 36" pig trap. Such a pig launching operation is generally described in U.S. Pat. No. 5,296,039 to Cooper and U.S. Pat. No. 5,769,955 to Kozisek.

Such pigs for this size of pipeline are quite large, typically eight feet or more in length, and are quite heavy as well, making them awkward to maneuver into the trap, and requiring considerable force to push through the reducer. The pigs typically have a solid core against which a force can be exerted to force the pig through the reducer into the trap. The is operation is complicated by the fact that once the pig trap is open, petroleum fumes are released and pose a fire hazard which require that operations include appropriate safety precautions. Often pigs are maneuvered into place by a loader or backhoe vehicle, and then pushed through the reducer into the trap by the vehicle as well, however operating internal combustion vehicles in proximity to the open pig trap presents a fire hazard. Alternatively it is known to rig a hydraulic cylinder to push the pig into the trap, however because of the length of the pig, such hydraulic cylinders must have a very long stroke of 10-12 feet, and so are costly and awkward to position and transport.

SUMMARY OF THE INVENTION

It is an object of the present invention to provide an apparatus for pushing a dual diameter pig into pipeline that overcomes problems in the prior art.

The present invention provides, in a first embodiment, an apparatus for pushing a dual diameter pig through a conical reducer attached to a pig trap and into a pipeline. The apparatus comprises a frame configured to support a pig longitudinally such that the pig can move forward along the frame, and having a front end adapted for attachment to the pig trap. At least one leg supports the frame such that a vertical position of the frame can be adjusted to align a front end of a pig supported on the frame with an open end of the conical reducer. An extendable actuator is supported on the frame such that the actuator is rearward of, and substantially aligned with, a pig supported on the frame, and an actuator control is operative to extend the actuator such that a front end thereof moves forward with respect to the frame and into contact with a central portion of a rear end of a pig supported on the frame, and is operative to retract the actuator. A lock is operative to selectively lock the actuator to the frame at a plurality of lock locations between the front end of the frame and the rear end thereof, and the lock locations are separated by a distance that is less than a stroke of the actuator.

The present invention provides, in a second embodiment, a method for pushing a dual diameter pig through a conical reducer attached to a pig trap and into a pipeline. The method comprises attaching a front end of a frame to the pig trap and supporting a pig longitudinally on the frame such that the pig can move forward along the frame; supporting the frame on at least one leg and adjusting a vertical position of the frame to substantially align a front end of the pig with an open end of the conical reducer; supporting an extendable actuator on the frame such that the actuator is rearward of, and substantially aligned with, the pig and locking the actuator to the frame at a first lock location; extending the actuator such that a front end thereof moves forward with respect to the frame and into contact with a central portion of a rear end of the pig, and pushes the pig partially into the conical reducer; retracting the actuator and unlocking the actuator from the frame; moving the actuator forward to a second lock location where the front end thereof is in proximity to the rear end of the pig and locking the actuator; extending the actuator and thereby pushing the pig farther into the conical reducer; and repeatedly retracting the actuator and unlocking the actuator from the frame, moving the actuator forward to further forward lock locations and locking the actuator to the frame, and extending the actuator, until the pig is located in the pig trap.

The method and apparatus of the invention uses a shorter actuator, such as a hydraulic cylinder, to push the pig through the reducer. By movably mounting the actuator to a frame, the actuator can be extended and retracted a number of times to push the pig through the required length of travel, rather than using a very long actuator to push the required length with a single stroke of the actuator.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
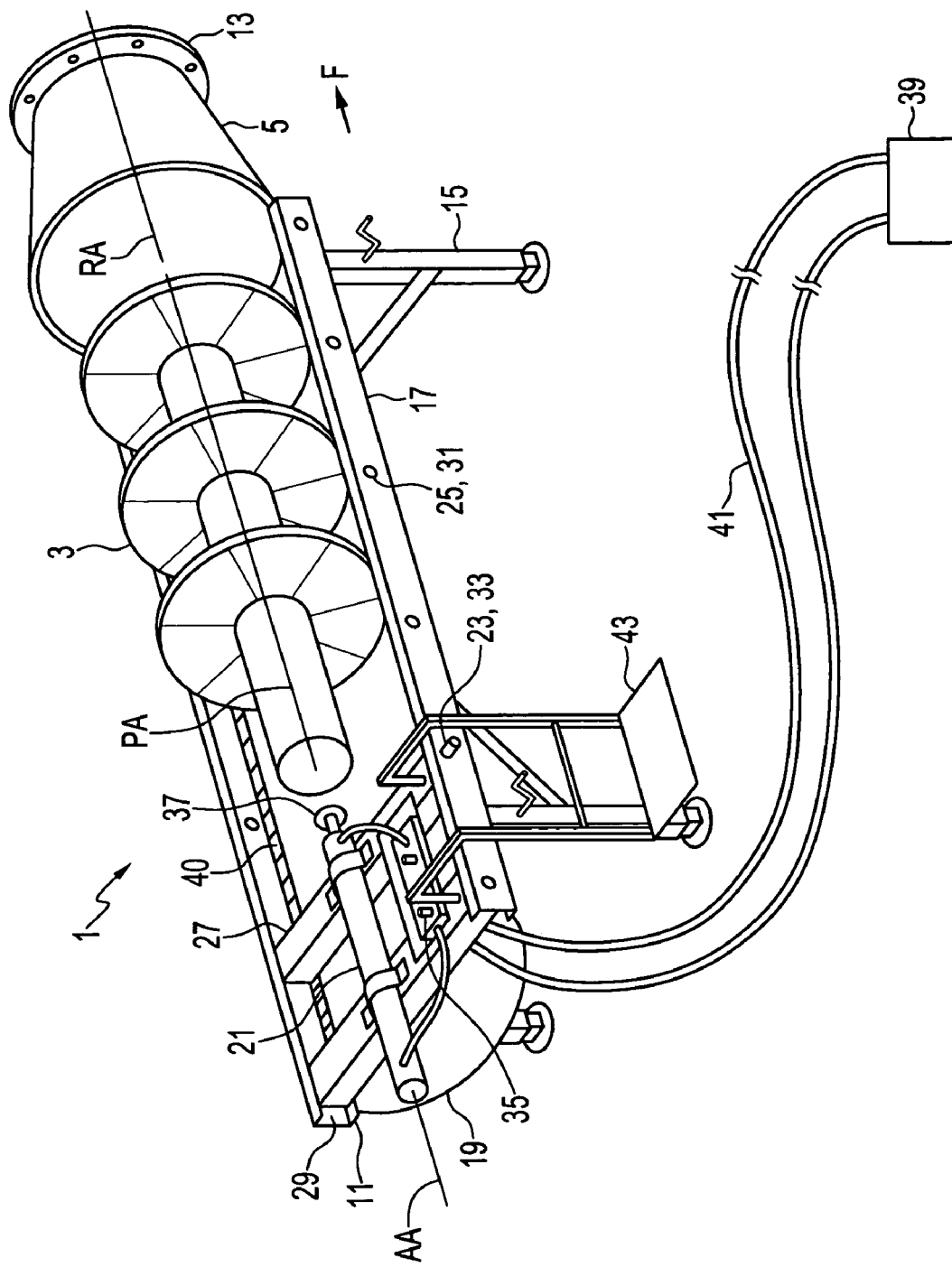
FIG. 1 is a schematic perspective view of an embodiment of an apparatus of the invention for pushing a dual diameter pig through a conical reducer into a pig trap and into a pipeline showing a dual diameter pig supported on the apparatus.
Figure 2:
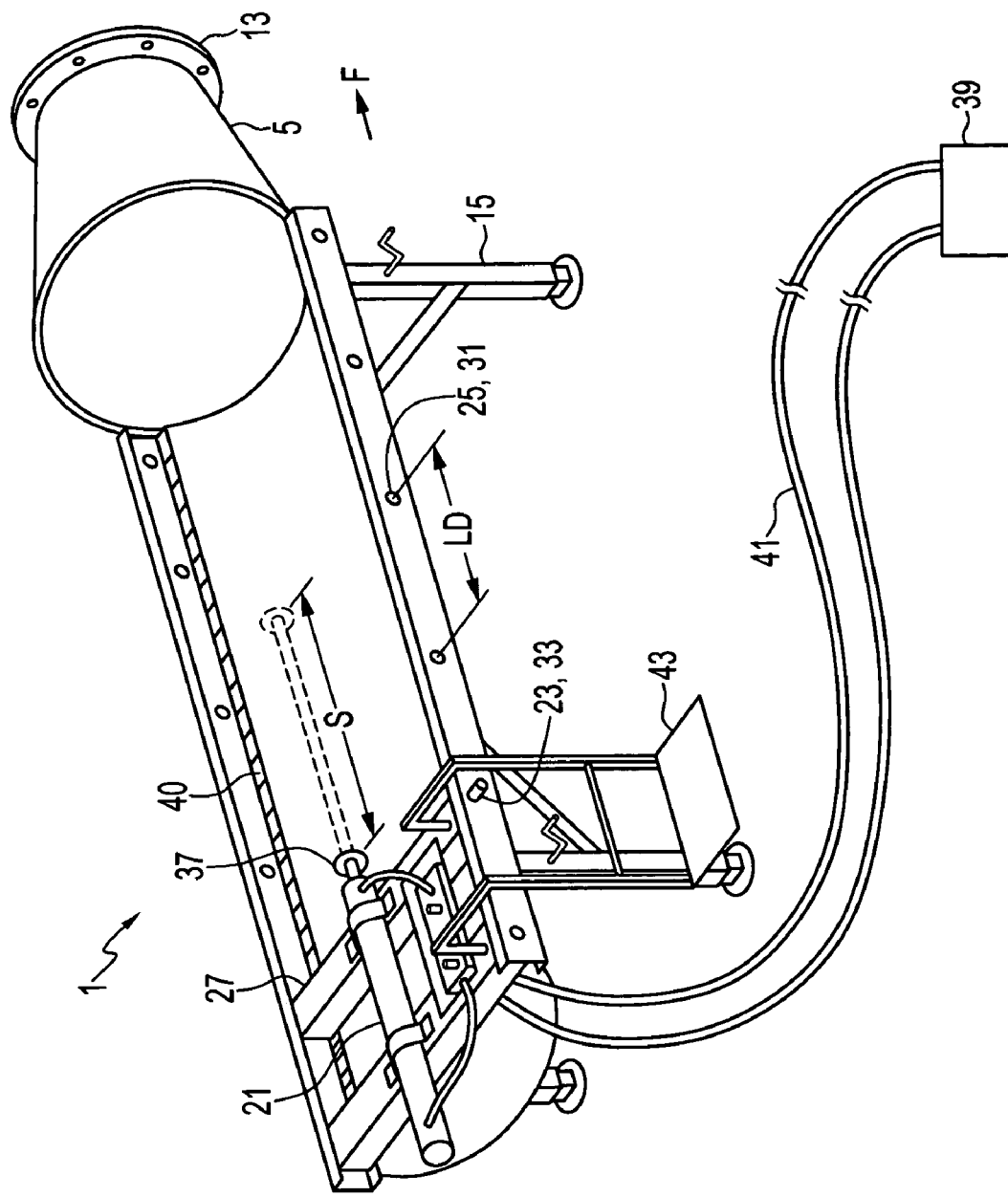
FIG. 2 is a perspective view of the embodiment of FIG. 1 with the pig removed showing the stroke distance of the actuator.

FIGS. 1 and 2 schematically illustrate an apparatus 1 for pushing a dual diameter pig 3 through a conical reducer 5 attached to a pig trap 7 and into a pipeline 9, as schematically illustrated in FIGS. 3-7. The apparatus comprises a frame 11 configured to support the pig 3 longitudinally such that the pig 3 can move forward in direction F along the frame 11. The front end of the frame 11 can be adapted for attachment to the pig trap 7 by links or other means which will be well known in the art. The frame 11 can be attached directly to the pig trap 7, or to the conical reducer 5 which is attached to the pig trap 7, or otherwise substantially fixed with respect to the pig trap 7 such that the forces exerted by the apparatus 1 will move the pig 3 into the conical reducer 5, and not move the apparatus 1 away from the pig trap 7. In the illustrated embodiment the conical reducer 5 is fixed by welding or the like to the front end of the frame 11 of the apparatus 1, such that the apparatus is attached to the pig trap 7 by the flange 13 on the conical reducer 5. The flange 13 is configured to match up with a corresponding flange on the pig trap 7, such that when the flanges are connected by bolts or the like, the apparatus is properly aligned for insertion of the pig 3 into the trap 7.

Legs 15 support the frame 11 such that the vertical position of the frame 11 can be adjusted to align the front end of the pig 3 with an open end of the conical reducer 5. In the illustrated embodiment, the frame 11 comprises right and left side rails 17 extending substantially from the front end to the rear end of the frame 11, and oriented substantially parallel to, and equidistant from, the axis RA of the conical reducer 5. The frame 11 further comprises a trough 19 configured to support the pig 3 between the side rails 17. The pig 3 is supported on the frame 11 such that a central axis PA of the pig 3 is substantially aligned with the axis RA of the conical reducer 5.

An extendable actuator 21 is supported on the frame 11 such that the actuator 21 is rearward of, and substantially aligned with the pig 3 supported on the frame 11. A lock 23 is operative to selectively lock the actuator 21 to the frame 11 at a plurality of lock locations 25 between the front end of the frame 11 and the rear end thereof. As illustrated in FIG. 2, the lock locations 25 are separated by a distance LD that is less than the stroke S of the actuator to allow the actuator to be extended to move the pig forward by the stroke distance S, and then retracted to allow movement forward to a next lock location 25, as described below.

Figure 3:
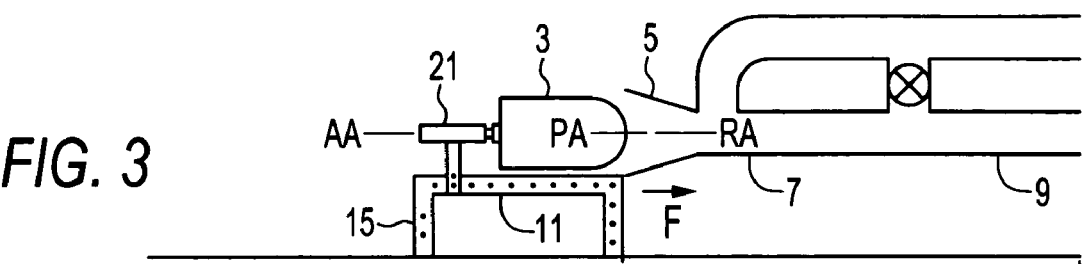
FIGS. 3-7 are schematic side views showing the steps of a method of the invention for launching a dual diameter pig.

In the illustrated embodiment, the extendable actuator 21 is attached to cross-member 27 extending from one side rail 17 of the frame 11 to the opposite side rail 17. The extendable actuator 21 is attached to the cross-member 27 at a location such that the axis AA of the actuator 21 is substantially aligned with the axis RA of the conical reducer 5 when the apparatus 1 is attached to the pig trap 7, and aligned with the central axis PA of the pig 3, as illustrated in FIG. 3. The lock 23 is operative to lock right and left ends of the cross-member 27 to corresponding right and left side rails 17.

In the illustrated embodiment, the right and left ends of the cross-member 27 engage grooves 29 along the corresponding right and left side rails 17, and are movable along the corresponding right and left side rails 17. Conveniently the side rails 17 are channel shaped to provide the grooves 29. The lock locations 25 are defined by rail apertures 31 defined by the side rails 17, and the illustrated lock 23 comprises a pin 33 in an end of the cross-member 27 passing through a rail aperture 31 that is aligned when the cross-member 27 is at a lock location. Alternatively the cross-member 27 could slide along the top of the side rails 17 and be pinned or otherwise locked to the side rails 17 by other mechanisms as are known in the art.

An actuator control 35 is operative to extend the actuator 21 such that a front end 37 thereof moves forward with respect to the frame 11 and into contact with a central portion of a rear end of the pig 3 as it is supported on the frame 11, and is operative to retract the actuator 21. The front end 35 of the actuator 21 has moves with a range equal to the stroke distance S illustrated in FIG. 2.

Conveniently the extendable actuator 21 comprises a hydraulic cylinder connected through the actuator control 35 to a hydraulic power supply 39 by hoses 41 of a length sufficient to allow the hydraulic power supply 39 to be located at a sufficient distance from the pig trap to reduce a fire hazard presented by operating the power supply in proximity to petroleum fumes from the pig trap.

The illustrated apparatus further includes a drive operative to move the cross-member 27 along the side rails 17. A link drive chain 40 is laid out and fixed along the top of the bottom flange of the right and left side rails 17. A corresponding sprocket is rotatably mounted at the right and left ends of the cross-member 27, and is conveniently driven by a hydraulic motor connected to the hydraulic power supply 39. The illustrated embodiment further comprises an operator platform 43 attached to the cross-member 27 such that an operator can occupy the platform 43 and move along the side rails 17 with the cross-member 27 while manipulating the actuator control 35 to push the pig 3 into the trap 7. A lever mechanism can be incorporated as well and connected to the pins 33 that lock the cross-member 27 to the side rails 17 to allow the operator to conveniently remove the pins 33 from the rail apertures 31 to allow the cross-member to move, and also allow re-insertion at the next lock location 25.

The method of the invention for pushing a dual diameter pig 3 through a conical reducer 5 attached to a pig trap 7 and into a pipeline 9 is schematically illustrated in FIGS. 3-7. The method comprises attaching the front end of the frame 11 to the pig trap 7, either directly or by attachment to the conical reducer 5 which is itself attached to the pig trap 7.

The pig 3 is placed longitudinally on the frame 11 such that the pig 11 can move forward in direction F along the frame 11, and a vertical position of the frame 11 is adjusted if necessary to substantially align a front end of the pig 3 with an open end of the conical reducer. The extendable actuator 21 is moved into position rearward of the pig 3 and is locked to the frame at a first lock location, illustrated in FIG. 3.

Figure 4:
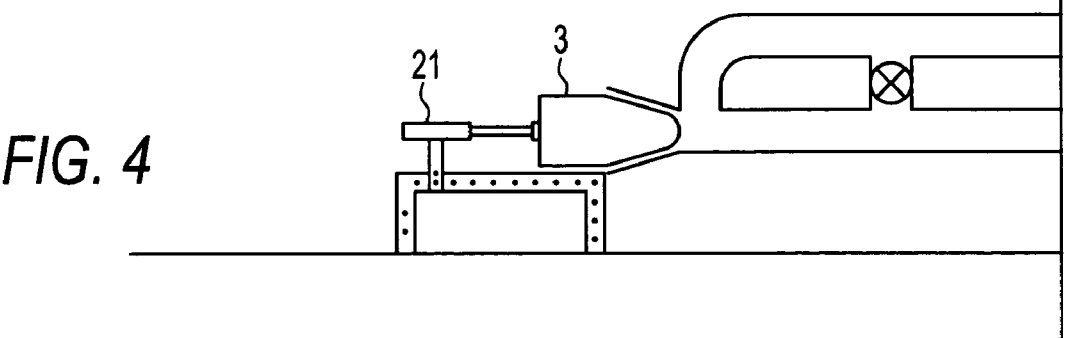
Figure 5:
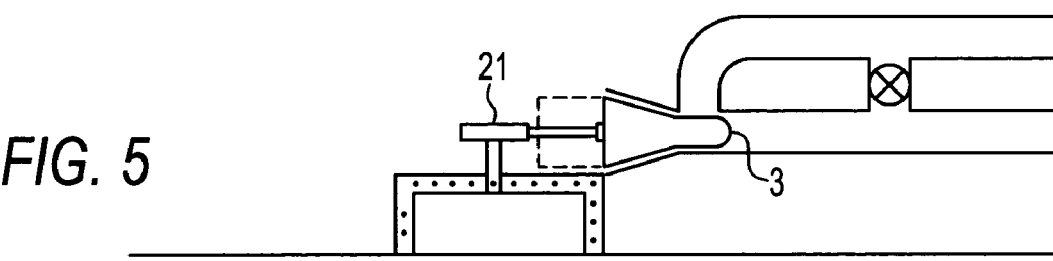
Figure 6:
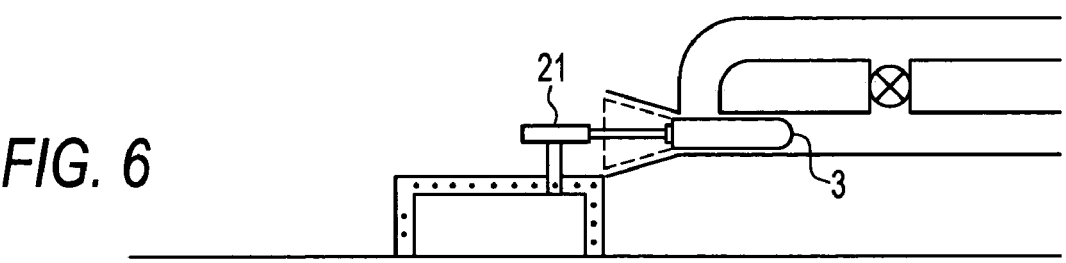
Figure 7:
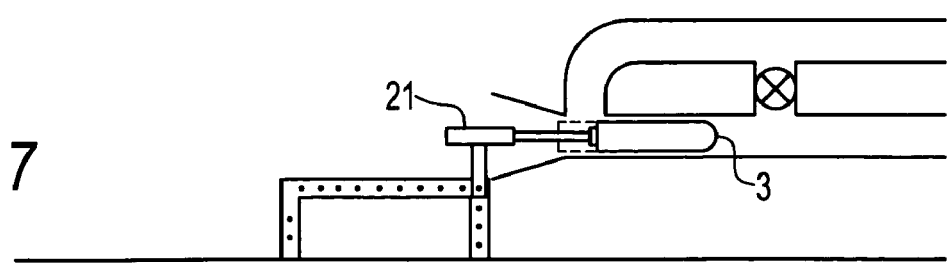

The actuator 21 is extended into contact with a central portion of a rear end of the pig 3 and pushes the pig 3 partially into the conical reducer 5, as illustrated in FIG. 4. The actuator 21 is then retracted and unlocked from the frame 11, moved forward to a second lock location illustrated in FIG. 5 where the front end thereof is in proximity to the rear end of the pig 3, and locked to the frame in the second lock location, and extended again, thereby pushing the pig 3 farther into the conical reducer as illustrated in FIG. 5. The pig is pushed completely into the pig trap 7 by repeatedly retracting the actuator 21 and unlocking the actuator 21 from the frame 11, moving the actuator 21 forward to further forward lock locations and locking the actuator 21 to the frame 11 and extending the actuator 21, until the pig 3 is located in the pig trap 7, as illustrated in FIG. 7.

The apparatus 1 uses a relatively compact actuator 21, and frame 11 that is relatively easy to set up and transport. Safety is improved by using a hydraulic power pack, or other actuator power source that can be located a safe distance from the petroleum fumes at the open mouth of the pig trap 7. The conical reducer 5 can be fixed to the apparatus 1, as illustrated, or can be otherwise made available at each location where the apparatus 1 will be used. Once the apparatus 1 is set up, the pig can be lifted on to the apparatus 1 by a loader vehicle, crane, or the like, which can then be removed prior to launching the pig 3.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

I claim:

1. An apparatus for pushing a dual diameter pig through a conical reducer attached to a pig trap and into a pipeline, the apparatus comprising:
    a frame configured to support a pig longitudinally such that the pig can move forward along the frame, and having a front end adapted for attachment to the pig trap;
    at least one leg supporting the frame such that a vertical position of the frame can be adjusted to align a front end of a pig supported on the frame with an open end of the conical reducer;
    an extendable actuator supported on the frame such that the actuator is rearward of, and substantially aligned with, a pig supported on the frame; and
    an actuator control operative to extend the actuator such that a front end thereof moves forward with respect to the frame and into contact with a central portion of a rear end of a pig supported on the frame, and operative to retract the actuator;
    a lock operative to selectively lock the actuator to the frame at a plurality of lock locations between the front end of the frame and the rear end thereof, and wherein the lock locations are separated by a distance that is less than a stroke of the actuator.

2. The apparatus of claim 1 wherein the extendable actuator is attached to a cross-member extending from one side of the frame to the opposite side of the frame, and wherein the lock is operative to lock right and left ends of the cross-member to corresponding right and left side of the frame.

3. The apparatus of claim 2 wherein the extendable actuator is attached to the cross-member at a location substantially aligned with an axis of the conical reducer.

4. The apparatus of claim 3 wherein the frame comprises right and left side rails extending substantially from the front end of the frame to a rear end of the frame, and oriented substantially parallel to, and equidistant from, the axis of the conical reducer when the frame is attached to the pig trap.

5. The apparatus of claim 4 wherein a pig is supported on the frame between the side rails such that a central axis of the pig is substantially aligned with the axis of the conical reducer.

6. The apparatus of claim 4 wherein the right and left ends of the cross-member are movable along the corresponding right and left side rails.

7. The apparatus of claim 6 wherein the right and left ends of the cross-member engage grooves along the corresponding right and left side rails.

8. The apparatus of claim 6 further comprising a drive operative to move the right and left ends of the cross-member along the corresponding right and left side rails.

9. The apparatus of claim 8 further comprising an operator platform attached to the cross-member such that an operator can occupy the platform and move along the side rails while manipulating the actuator control.

10. The apparatus of claim 4 wherein the lock locations are defined by rail apertures defined by the side rails, and wherein the lock comprises a pin passing through a pin aperture in an end of the cross-member and through a rail aperture that is aligned with the pin aperture when the cross-member is at a lock location.

11. The apparatus of claim 4 wherein the frame comprises a trough configured to support a pig longitudinally between the side rails.

12. The apparatus of claim 1 wherein the front end of the frame is attached to the pig trap by attachment to the conical reducer.

13. The apparatus of claim 12 further comprising a conical reducer attached to the front end of the frame.

14. The apparatus of claim 1 wherein the extendable actuator comprises a hydraulic cylinder connected to a hydraulic power supply by hoses of a length sufficient to allow the hydraulic power supply to be located at a sufficient distance from the pig trap to reduce a fire hazard presented by operating the power supply in proximity to petroleum fumes from the pig trap.

* * * * *